March 3, 1953   R. H. STEVENS   2,630,145
SPRING UNIT ASSEMBLING MACHINE
Filed Feb. 10, 1949   3 Sheets-Sheet 1

Inventor
Robert H. Stevens
Barthel & Bugbee
Attorneys

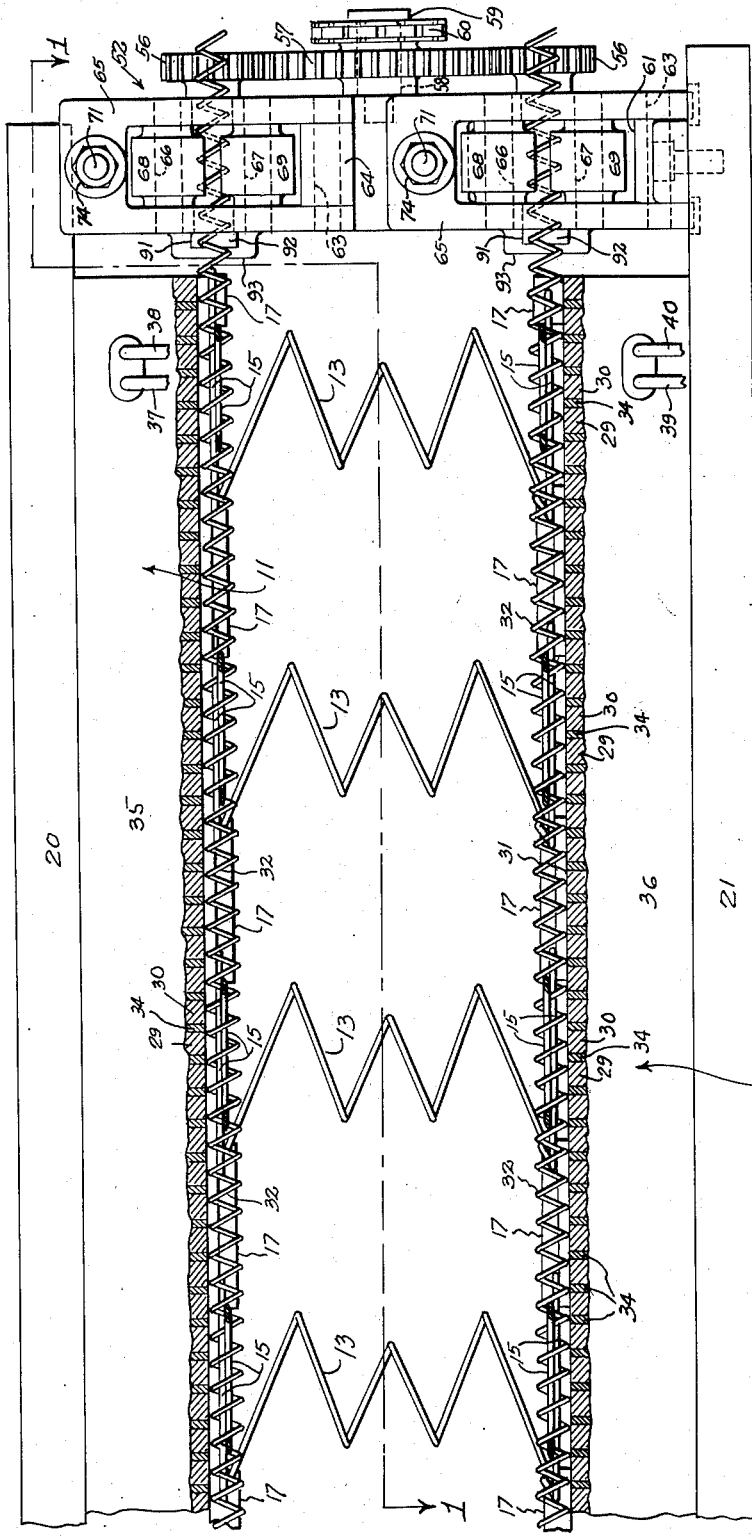

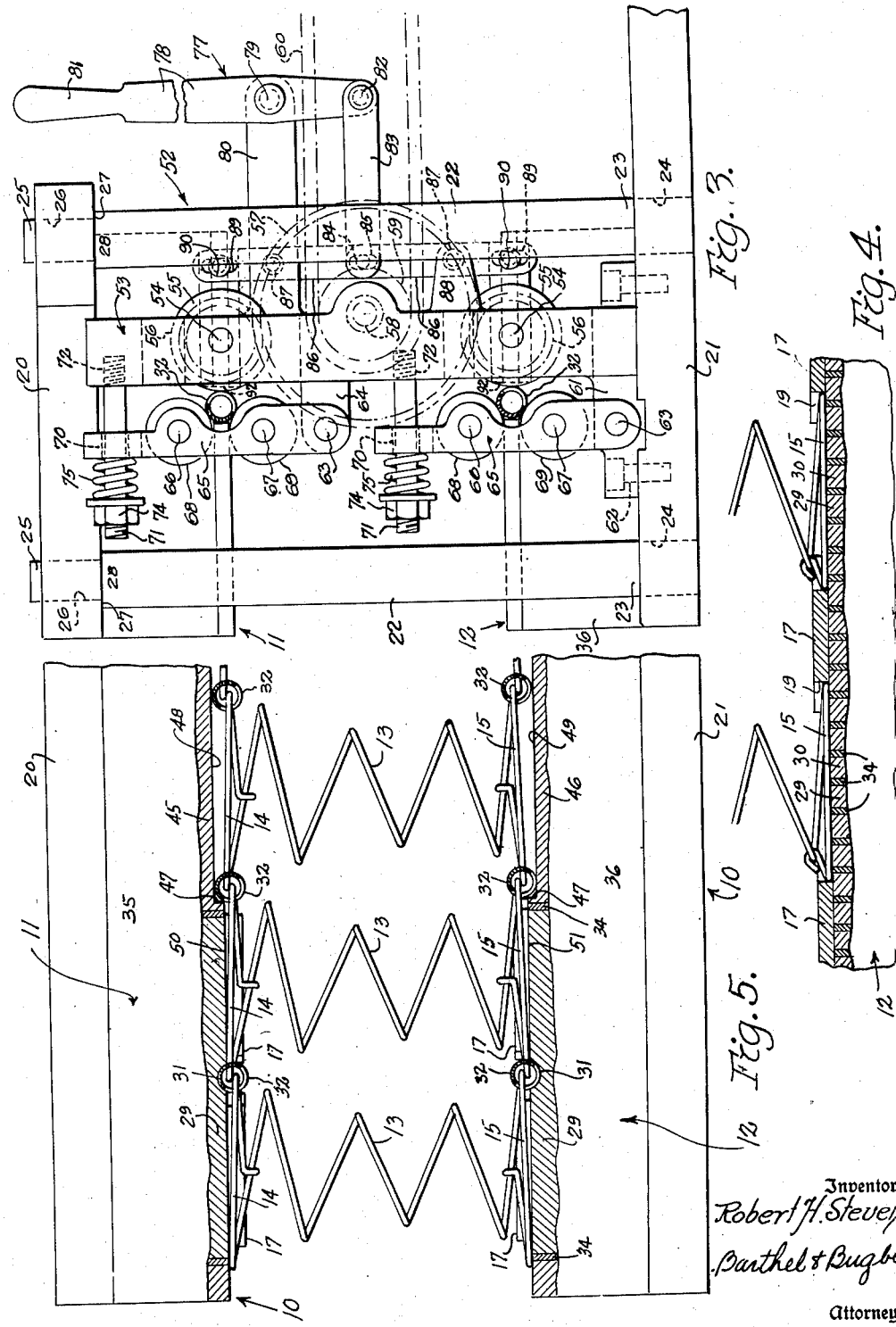

Patented Mar. 3, 1953

2,630,145

UNITED STATES PATENT OFFICE 2,630,145

SPRING UNIT ASSEMBLING MACHINE

Robert H. Stevens, Detroit, Mich.

Application February 10, 1949, Serial No. 75,662

3 Claims. (Cl. 140—92.3)

This invention relates to spring assembling machines and, in particular, to helical spring unit assembling machines.

One object of this invention is to provide a helical spring unit assembling machine wherein the helical springs are held magnetically in position with their peripheries in close proximity to one another while they are laced together by means of helical lacing springs.

Another object is to provide a helical spring unit assembling machine wherein the opposite ends of the helical springs are held magnetically in temporarily fixed positions with portions of their peripheries in close proximity to one another while such portions are laced together by helical lacing springs.

Another object is to provide a helical spring unit assembling machine of the foregoing character wherein the lacing springs are also urged magnetically into their proper lacing directions so as to prevent deviation of the lacing springs and consequent faulty lacing of the helical springs.

Another object is to provide a helical spring unit assembling machine of the foregoing character wherein the magnetic spring holding device is automatically demagnetized in response to the arrival of the lacing spring at a predetermined location at the termination of the lacing operation for the pair of rows of springs being interlaced.

Another object is to provide a helical spring unit assembling machine of the foregoing character wherein the helical springs are held in sockets by abutment members adjacent the magnetic holding device, the abutment members being preferably removable and interchangeable with other abutment members proportioned for different sizes and/or spacing of helical springs, so as to adapt the machine to a widely varying range of work employing different sizes of springs.

In the drawings:

Figure 2 is a vertical section taken along the line 2—2 in Figure 1, showing the upper and lower holding magnets at the interlacing plane;

Figure 3 is a right-hand end elevation of the spring unit assembling machine shown in Figures 1 and 2;

Figure 4 is a fragmentary vertical section showing the spring sockets taken along the line 4—4 in Figure 1; and Figure 5 is a vertical cross-section through the spring unit assembling machine, taken along the line 5—5 in Figure 1, and showing the interlacing of the adjacent portions of the helical spring by the lacing spring.

Figure 1:
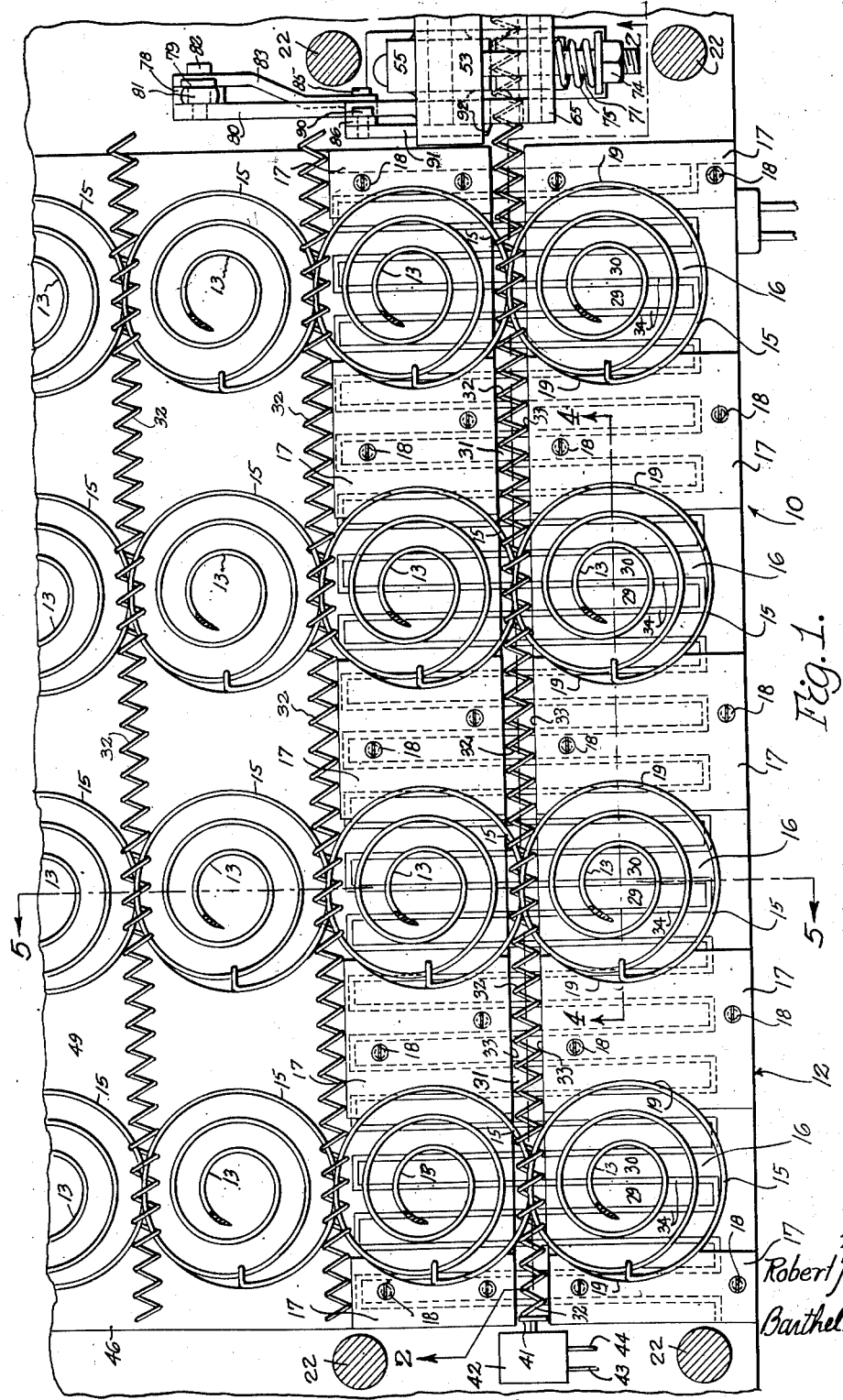
Figure 1 is a horizontal section through a helical spring unit assembling machine, according to a preferred form of the invention, taken along the line 1—1 in Figure 2, omitting the magnetic holder.

Hitherto, the manufacture of spring units such as inner spring units for mattresses, cushions and the like has required expert, careful and vigilant action on the part of the workman in assembling the helical spring into spring units by means of elongated lacing springs, since the lacing springs occasionally fail to pursue straight-line paths and instead tend to deviate from their proper courses. If the operator does not detect such deviations of the lacing springs from their proper directions, the spring unit becomes faultily assembled and has to be torn down at the defective point and reassembled properly at that point. In the attempt to overcome these disadvantages and to remove the necessity for such vigilance and care on the part of the workman, certain prior machines have been devised employing elaborate jaws and complicated release pins to hold the helical springs while the lacing springs are guided or woven through the intersecting portions of the helical springs either automatically or by hand. Such prior machines have been very complicated mechanically as well as expensive and delicate, with the result that occasional breakdowns and the cost of servicing the machine, as well as its cost of idleness have added considerably to the expense incurred in the original purchase of the machine.

The machine of the present invention was devised in the effort to eliminate the complicated and delicate mechanisms of past machines as described briefly above, and instead, provides a relatively simple machine wherein the helical springs are held firmly in their intersecting positions by magnetic holders which also preferably attract the lacing springs and prevent them from deviating from their true paths through the intersecting portions of the helical springs. In this manner, the present machine prevents deviations which have hitherto resulted in faulty spring units, and insures that the springs are properly assembled. Furthermore, in the present machine, the lacing spring engages and actuates an electric switch when it reaches the end of its lacing path, thereby de-energizing the magnetic holder and permitting the spring unit thus far assembled to be moved so that an additional row of helical springs may be placed in the machine and laced to the exposed row of springs previously laced. In this manner, the helical springs are assembled, with their lacing springs, into a complete spring unit of any convenient size in a very short time and with a certainty of correct assembly not hitherto attainable in a simple and inexpensive way.

Referring to the drawings in detail, Figures 1, 2, 3 and 5 show related portions of a helical spring unit assembling machne, generally designated 10 according to a preferred form of the invention. For purposes of simplification, the machine is shown of a size capable of assembling a spring unit with four springs in each row. A spring unit of this size, however, would be suitable only for a small cushion, but it sufficiently exemplifies the invention since it will be obvious from the following description and the accompanying drawings that a machine of any convenient size may be made merely by enlarging the machine shown and by multiplying the number of spring sockets.

The helical spring unit assembling machine 10 includes upper and lower magnetic spring holders 11 and 12 respectively (Figures 2, 3 and 5) spaced apart from one another vertically so as to permit the easy insertion of helical springs 13 between them. The helical springs 13 are of a conventional type well known to those in the spring industry. The uppermost and lowermost convolutions 14 and 15 respectively of the first two rows of springs 13 are held in sockets 16 (Figure 4) formed by two rows of spaced abutments or locating members 17 secured as at 18 to the magnetic holders 11 and 12, the abutments 17 having arcuate walls 19 configured to fit the springs to be assembled. As previously stated, the abutments 17 may be of any convenient size and spacing, depending upon the dimensions and spacing of the springs to be assembled.

The magnetic spring holders 11 and 12 are secured to plate-like top and bottom members 20 and 21 respectively interconnected and spaced apart from one another by posts or uprights 22 (Figures 1 and 3). The lower portions 23 of the uprights 22 are inserted in holes 24 in the bottom member 21 whereas the reduced diameter upper portions 25 are similarly inserted in holes 26 in the upper member 20 (Figure 3). The upper portions 25 are made sufficiently long so that the top member 20 may be raised and lowered if desired, when heavy duty springs are to be assembled and these springs are too stiff to be easily compressed sufficiently by the operator to be inserted between the upper and lower abutments 17 so as to snap into the sockets 16. The top members 20 rest upon annular shoulders 27 surrounding the reduced diameter portions 25 at their junctions with the larger diameter intermediate portions 28 of the uprights 22.

Between the two rows of abutments 17, the elongated pole pieces 29 and 30 of the magnetic spring holders 11 and 12 are grooved transversely as at 31 to form guide troughs for the helical lacing springs 32. These are additionally guided by the adjacent edges or ends 33 of the abutments 17 (Figure 1). In the magnetic spring holders 11 and 12, the pole pieces 29 and 30 are arranged in interlocking undulating relationship (Figure 1) in a so-called "wall of Rome" or crenelated pattern separated by a zig-zag undulating gap 34 between the poles 29 and 30 which are, of course, of opposite polarities. The gap 34 is preferably filled with non-magnetic material to exclude dirt and other foreign matter.

The poles 29 and 30 are of soft iron or other suitable temporarily magnetic material and are magnetized by windings (not shown) within the hollow holder bases 35 and 36 upon which the pole pieces 29 and 30 are mounted, these coils being connected to and energized by conductors 37, 38, 39 and 40 (Figure 2) connected to a suitable source of current electricity. Positioned at the left-hand or rearward end of each lacing spring groove 31 is the movable operating member 41 (Figure 1) of a normally-closed limit switch 42, preferably a micro-switch, the wires 43 and 44 of which are in circuit with a relay (not shown) which controls the energization of the conductors 37, 38, 39 and 40 in such a manner that the magnetic spring holders 11 and 12 are automatically de-energized when the end of the lacing spring 32 reaches the end of its guide groove 31 after lacing together the uppermost and lowermost convolutions 14 and 15 of the helical springs 13.

Beyond the second row of abutments 17 (Figures 1 and 5) the machine is provided with upper and lower supporting members or tables 45 and 46 respectively having steps 47 (Figure 5) between their contact surfaces 48 and 49 and the surfaces 50 and 51 of the upper and lower magnetic holders 11 and 12 respectively. Thus, the surfaces 48 and 49 are separated by a greater distance than the surfaces 50 and 51, permitting the springs 13 to expand and relax their tension when they pass beyond the shoulders 47.

In order to rotate the lacing springs 32 so that they thread their ways along the guide grooves 31 and interlace the springs 13, a lacing spring driving mechanism, generally designated 52 is provided (Figures 1, 2 and 3). This consists of an upright structure 53 on which are mounted pivot pins or axles 54 carrying fixed rollers 55 rotated by pinions 56 meshing with a gear 57 upon the shaft 58 and connected to a sprocket 59 driven by a sprocket chain 60 from a suitable source of power, such as a drive sprocket driven through reduction gearing from an electric motor (not shown). The upright structure 53 has a base 61 secured as at 62 to the bottom member 21. Pivotally mounted on pivot pins 63 secured to the base 61 or to a bracket 64 extending outward from the upright structure 53 are swinging roller arms 65 (Figure 3) carrying upper and lower spaced axles or pivot pins 66 and 67 upon which are mounted contact rollers 68 and 69 respectively. The arms 65 at their upper ends are bored as at 70 for the passage of studs 71. One end of each stud 71 is threaded into a threaded socket 72 in the upright structure 53, whereas the other end is threaded to receive a nut 74 adapted to compress a spring 75 surrounding each stud 71.

In this manner, the rollers 68 and 69 resiliently urge the lacing springs 32 into driving engagement with the rollers 55, thereby rotating the lacing springs 32 so as to thread them or weave them through their guide grooves 31 and the upper and lower convolutions 14 and 15 of the coil springs 13 (Figure 5.) In order to halt the driving rollers 55, the motor which drives the sprocket chain 60 is preferably placed in the energization circuit of the magnet holders 11 and 12 so as to be similarly controlled by the micro-switch 42.

In order to cut off the lacing springs 32 when they have been fed a sufficient distance into the machine, a cutting device, generally designated 77 (Figure 3) is provided. This consists of a hand lever 78 pivotally mounted as at 79 on a bracket 80 extending laterally from the upright structure 53. The upper end of the lever 77 is provided with a handle 81, whereas the lower end carries a pivot pin 82 connected to one end of a link 83, the opposite end of which carries a pin 84 or other fastener engaging an elongated slot 85 in the adjacent ends of a pair of levers 86. The levers 86 are pivoted intermediate their ends on pivot pins 87, the upper of which is mounted on the bracket 80 and the lower on a bracket 88 extending outward from the upright structure 53. At their remaining ends, the levers 86 are provided with elongated slots 89 engaging pins 90 seated in the outer ends of reciprocating cutter bars 91. The cutter bars 91 have sharpened inner ends 92 and are guided as at 93 along parallel paths (Figure 2) so as to intersect the lacing springs 32 (Figure 1) and cut them off when the operator so desires.

*Operation*

In the operation of the helical spring unit assembling machine 10 of this invention, let it be assumed that the machine is completely free from springs but that a supply of helical springs 13 is at hand. To start the assembling operation, the operator manually compresses the coil springs 13 one by one with his fingers and inserts their upper and lower convolutions 14 and 15 one by one into the sockets 16. As the springs reach the two rows of sockets 16, they snap into the sockets, thereby causing the upper and lower convolutions 15 of each successive row of coil springs 13 to overlap those of the preceding row, as shown in Figure 5. The operator then energizes the magnetizing coils of the magnetic spring holders 11 and 12, causing a magnetic field to be set up and magnetic flux lines of force to cross the gaps 34. Since the springs 13 are made of steel, their convolutions 14 and 15 are strongly attracted wherever they cross the zigzag gap 34. It will be assumed that the strength of the magnetic field is adjusted, as by a suitable rheostat (not shown) until the magnetic force is sufficient to hold the lacing springs 32 in their guide grooves 31 without seriously impeding their progress while they are rotating and advancing from right to left (Figure 1) during the lacing operation.

Meanwhile, the lacing spring driving mechanism 52 has been set in motion by supplying power to the sprocket chain 60. This rotates the driving rollers 55 and accordingly rotates the lacing springs 32, so that they thread their way in spiral paths along their guide grooves 31 between the ends 33 of the abutments 17. As the lacing springs 31 pass the overlapping portions of the upper and lower convolutions 14 and 15 (Figure 5), they interlace these portions (Figure 1) and continue onward in their spiral path much like a screw threading its way into a threaded hole. When the lacing springs 32 arrive at the ends of their travel (Figure 1), they actuate the limit switches 42, thereby opening the circuit to the conductors 37, 38, 39, 40, de-energizing the magnetic spring holders 11 and 12. These therefore release their grips upon the springs 13 and lacing springs 32.

The de-energization of the energization circuit of the magnetic spring holders 11 and 12 also de-energizes the driving motor (not shown) for the sprocket chain 60 (Figure 3) which rotates the driving rollers 55 for rotating the lacing springs 32, bringing them to a halt. If necessary, of course, the motor may be equipped with a conventional magnetic brake to halt it instantaneously and prevent overrunning. Such magnetic brakes are well-known in the electric motor field.

The operator now actuates the hand lever 81 to move the cutter bars 91 to cause the cutting edges 92 to cut off the lacing springs 32. By compressing the springs 13 again slightly with his hands, the operator can detach the springs from their sockets 16 and slide the interlaced assembly rearwardly over the shoulders 47 onto the table surfaces 48 and 49 (Figure 5). The operator then repeats the foregoing operation, replenishing the forward row of sockets with a new supply of springs. These are then laced to the rearward row in the same manner previously described above, and so forth until the spring unit of the desired size has been assembled. The latter is then removed from the machine and is ready for subsequent upholstering operations.

What I claim is:

1. A machine for assembling helical springs into units by lacing springs, said machine comprising a spring support, a magnetizable spring holder including an electro-magnet associated with said support, an electrical energization circuit connected to said electro-magnet, a plurality of rows of spring-locating members disposed in proximity to said support and positioned to effect intersection of the outer convolutions of said helical springs, and a lacing spring guide arranged between said rows of spring-locating members, said lacing spring guide being disposed adjacent said magnetizable spring holder and in the magnetic field thereof.

2. A machine for assembling helical springs into units by lacing springs, said machine comprising a spring support, a magnetizable spring holder including an electro-magnet associated with said support, an electrical energization circuit connected to said electro-magnet, a plurality of rows of spring-locating members disposed in proximity to said support and positioned to effect intersection of the outer convolutions of said helical springs, a lacing spring guide arranged between said rows of spring-locating members, said lacing spring guide being disposed adjacent said magnetizable spring holder and in the magnetic field thereof, and power-operated rotating mechanism drivingly engaging said lacing spring.

3. A machine for assembling helical springs into units by lacing springs, said machine comprising a spring support, a magnetizable spring holder including an electro-magnet associated with said support, an electrical energization circuit connected to said electro-magnet, a plurality of rows of spring-locating members disposed in proximity to said support and positioned to effect intersection of the outer convolutions of said helical springs, a lacing spring guide arranged between said rows of spring-locating members, said lacing spring guide being disposed adjacent said magnetizable spring holder and in the magnetic field thereof, and a limit switch connected to said circuit and responsive to the arrival of said lacing spring at a predetermined position for de-energizing said holder.

ROBERT H. STEVENS.

REFERENCES CITED

The following references are of record in the file of this patent:

UNITED STATES PATENTS

| Number | Name | Date |
|---|---|---|
| 687,931 | Barr | Dec. 3, 1901 |
| 1,665,226 | Simmons | Apr. 10, 1928 |
| 2,012,904 | Bowersox | Aug. 27, 1935 |
| 2,161,689 | Strandberg | June 6, 1939 |
| 2,209,558 | Bing | July 30, 1940 |
| 2,282,664 | Marcus | May 12, 1942 |
| 2,351,659 | Bronstien | June 20, 1944 |
| 2,388,106 | Woller | Oct. 30, 1945 |
| 2,470,812 | Gauci | May 24, 1949 |

FOREIGN PATENTS

| Number | Country | Date |
|---|---|---|
| 113,568 | Great Britain | Feb. 28, 1918 |
| 118,993 | Germany | Feb. 19, 1907 |